(12) United States Patent
Edie et al.

(10) Patent No.: US 6,845,340 B2
(45) Date of Patent: Jan. 18, 2005

(54) SYSTEM AND METHOD FOR MACHINING DATA MANAGEMENT

(75) Inventors: Paul Charles Edie, Troy, MI (US); Roderick Alexander Simpson, Windsor (CA); Ingrid Margrit Kaufman, Ann Arbor, MI (US)

(73) Assignee: Ford Motor Company, Dearborn, MI (US)

( * ) Notice: Subject to any disclaimer, the term of this patent is extended or adjusted under 35 U.S.C. 154(b) by 34 days.

(21) Appl. No.: 10/382,963

(22) Filed: Mar. 6, 2003

(65) Prior Publication Data

US 2004/0176926 A1 Sep. 9, 2004

(51) Int. Cl.⁷ .............................................. G06F 11/32
(52) U.S. Cl. ..................................... 702/179; 324/522
(58) Field of Search ............................... 702/179, 182; 324/500, 522

(56) References Cited

U.S. PATENT DOCUMENTS

| | | | |
|---|---|---|---|
| 4,723,219 A | | 2/1988 | Beyer et al. |
| 4,985,857 A | | 1/1991 | Bajpai et al. |
| 5,119,318 A | * | 6/1992 | Paradies et al. ............... 706/52 |
| 5,339,257 A | * | 8/1994 | Layden et al. ................ 702/84 |
| 5,407,265 A | | 4/1995 | Hamidieh et al. |
| 5,663,894 A | | 9/1997 | Seth et al. |
| 5,672,230 A | * | 9/1997 | Park et al. ............. 156/345.15 |
| 6,289,735 B1 | | 9/2001 | Dister et al. |
| 6,324,659 B1 | * | 11/2001 | Pierro .......................... 714/48 |
| 6,484,109 B1 | | 11/2002 | Lofall |
| 6,496,789 B2 | | 12/2002 | Seth et al. |
| 6,587,744 B1 | * | 7/2003 | Stoddard et al. ............ 700/121 |
| 6,738,748 B2 | * | 5/2004 | Wetzer ........................ 705/9 |
| 2002/0017139 A1 | | 2/2002 | Kluft et al. |
| 2002/0077776 A1 | | 6/2002 | Seth et al. |
| 2002/0129653 A1 | | 9/2002 | Seth et al. |

* cited by examiner

Primary Examiner—Edward Raymond
(74) Attorney, Agent, or Firm—Brooks & Kushman P.C.; Raymond L. Coppiellie

(57) ABSTRACT

A system and method for machining data management is provided. Vibration and operation data are gathered from a machine tool and sent to a processing unit. The processing unit defines operation-specific vibration profiles, and generates an operation-specific data line for each profile. The data lines are stored in a memory for later retrieval. An output device is used to retrieve the data lines and plot them over a time domain to create an operation-specific data matrix useful in manufacturing operations analysis.

22 Claims, 7 Drawing Sheets

SYSTEM AND METHOD FOR MACHINING DATA MANAGEMENT

BACKGROUND OF THE INVENTION

1. Field of the Invention

The present invention relates to a system and method for machining process characterization.

2. Background Art

The ever-increasing emphasis on product quality continues to put pressure on manufacturers to find new ways to produce high quality products without increasing production time or otherwise increasing manufacturing costs. Inherent in this high quality, low cost dichotomy is a need to reduce scrap, while obtaining the longest possible life from manufacturing tools and equipment. Thus, increasing the number of tooling changes and/or decreasing the time between machine tool maintenance may increase product quality, but it may result in an unnecessary increase in tooling costs and/or lost production time.

Over time, manufacturers have developed systems and methods of predictive and preventative maintenance. Such systems may include a scheduled tool change based on a number of parts produced, or scheduled machine down time, during which bearings and other components may be replaced prior to their having an adverse effect on product quality. In order to implement these systems in a cost effective manner, decision-makers need information. In particular, information that is indicative of historical trends is useful, so that accurate predictions can be made regarding future production runs. In addition, the ability to isolate particular problem areas is also useful; this helps to concentrate efforts where they will have the most impact and produce the most benefit.

Toward this end, manufacturers have continued to analyze machine tools and their associated components in an effort to gather information they can use to make efficacious decisions regarding their production systems and processes. One type of machine tool analysis used is a vibration analysis. Information gathered from this type of analysis may be indicative of a variety of different production problems.

One system and method of characterizing a machining process using vibrational signatures of machines is described in U.S. Pat. No. 5,663,894, issued to Seth et al. on Sep. 2, 1997. Seth et al. describes characterizing the vibrational signatures of machines by discriminating vibrational activity at various positions on the machines. This is done both with and without machining loads. Both time and frequency domain analysis may then be stored in a database for future comparison and tracking.

Although other systems and methods exist for analyzing various machine operation parameters, such as vibrations, none provides a mechanism for isolating the data and managing it to develop an operation-specific data matrix. Such information may be useful to a manufacturing decision-maker, particularly in a multi-tool, Computer Numerical Control (CNC) machine environment.

Accordingly, there exists a need for a system and method of machining data management for a machine tool having multiple cutting tools, such that data profiles of individual operations are easily analyzed, and such that the data profiles may be processed to provide an operation-specific data matrix and operation-specific trend lines.

SUMMARY OF THE INVENTION

Therefore, a method for managing machine tool data is provided. The machine tool has a plurality of tools for performing machining operations on a workpiece, at least one sensor operatively connected to the machine tool for sensing a machine operation parameter and outputting signals related to the sensed parameter, and a controller configured to output signals related to the machining operations. The method comprises performing a first set of operations on the workpiece. Data from signals output from the at least one sensor and from the controller are processed to define operation-specific data profiles. An algorithm is applied to at least some of the operation-specific data profiles to generate an operation-specific data line for each of the at least some operation-specific data profiles. This facilitates generation of an operation-specific data matrix. The data lines have a time dependent length, and they represent a statistical value of the sensed parameter.

Another aspect of the invention provides a method for managing machine tool data using a data matrix. The machine tool has a plurality of tools for performing machining operations on a workpiece. At least one sensor is operatively connected to the machine tool for sensing a machine operation parameter and for outputting signals related to the sensed parameter. The machine tool also has a controller configured to output signals related to the machining operations. The method comprises sensing a machine operation parameter from the machine tool for a first set of machining operations. Data related to the sensed parameter is stored; data from signals output from the controller is also stored. The data from the sensor is associated with the data from the controller, thereby defining operation-specific data profiles. An algorithm is applied to at least some of the operation-specific data profiles to generate an operation-specific data line for each of the at least some operation-specific vibration profiles. The operation-specific data lines are stored, thereby facilitating subsequent retrieval.

A further aspect of the invention provides a data management system for a machine tool. The machine tool has a plurality of tools for performing machining operations on a workpiece, and a controller configured to output signals related to the machining operations. The data management system comprises a sensor configured to be operatively connected to the machine tool for sensing a machine operation parameter and outputting signals related to the sensed parameter. A processor is operatively associated with the sensor and the controller, and is configured to associate data from the signals output from the sensor and from the controller to generate operation-specific data profiles. The processor is further configured to apply an algorithm to at least some of the operation-specific data profiles, thereby generating an operation-specific data line for each of the at least some operation-specific data profiles. The data management system also includes a memory operatively associated with the sensor, the controller, and the processor, and configured to store information including the operation-specific data lines, thereby facilitating subsequent retrieval of the stored information.

DETAILED DESCRIPTION OF THE PREFERRED EMBODIMENT(S)

Figure 1:
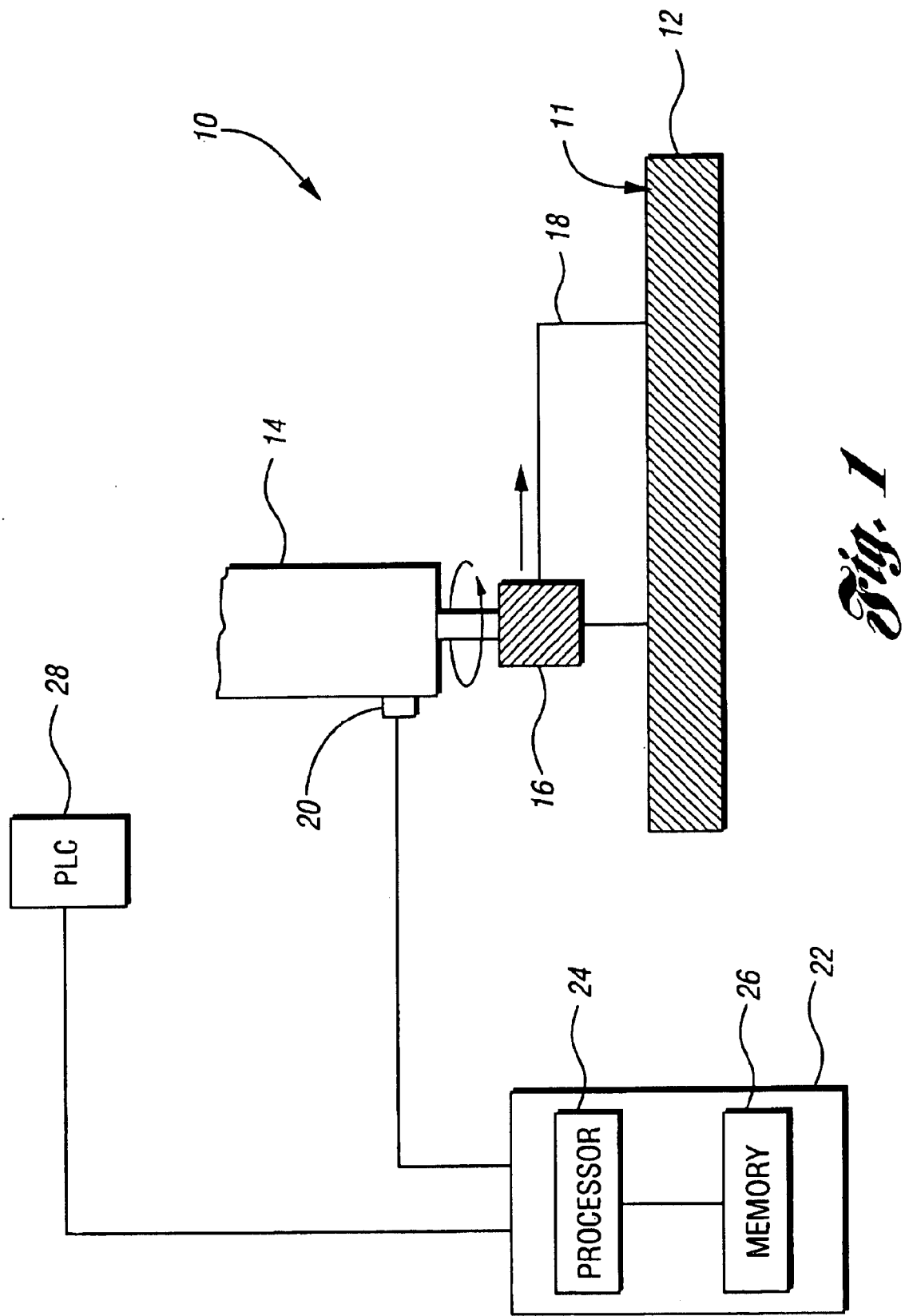
FIG. 1 is a partial schematic representation of a system in accordance with the present invention.

Elements of a data management system 10 in accordance with the present invention are illustrated in FIG. 1. A portion of a machine tool 11 includes a bed 12 and a spindle 14. Mounted in the spindle 14 is a cutting tool 16, which is used to machine a workpiece 18. Attached to the spindle 14 is a vibration sensor 20 that is configured to sense vibrations in the spindle 14 and output signals related to the vibrations to a processing unit 22. The vibration sensor 20 may be chosen from any one of a number of types of vibration sensors, such as an accelerometer, a velocity sensor, or any other suitable sensor capable of sensing vibrations.

Of course, other types of sensors may be used—i.e., ones that sense machine operation parameters other than vibrations. For example, a current sensor may be used to measure changes in the amount of current the machine tool 11 draws during various machining operations. Similarly, a thermocouple, or other type of temperature sensor, could be used to detect changes in temperature of some portion of the machine tool 11. The spindle speed or torque could also be sensed to provide information relating to the machining operations. Indeed, any sensor capable of sensing a machine operation parameter can be used to send signals to the processing unit 22.

The processing unit 22 may be conveniently mounted directly on a portion of the machine tool 11, and includes a processor 24 and a memory 26. The processor 24 may be programmed to perform specific instruction sets on data, such as vibration data received from the sensor 20. A controller, such as a PLC 28, is also attached to the machine tool 11, and may be programmed with information specific to the machine tool 11, or specific to a machining process or cycle performed by the machine tool 11. The processor 24 and the memory 26 are both operatively connected to the sensor 20 and the PLC 28, such that data may be transferred among them.

As noted above, the PLC 28 may be programmed with information regarding particular machining operations. It is configured to output signals related to the machining processes to the processing unit 22. For example, if a set of machining operations are being performed on the workpiece 12, and completion of this set of operations constitutes a machining cycle, the PLC 28 can, among other things, output signals to the processing unit 22 delineating different portions of the machining cycle. Thus, the PLC 28 may send a tool pickup signal each time a different tool is used in a set of machining operations.

The PLC 28 may also send signals indicating when a particular cutting tool, such as the cutting tool 16, is performing a particular machining operation. In addition, the PLC 28 may communicate to the processing unit 22 when the machine tool 11 is idling, and may further communicate time related data such as the number of machining cycles performed or the number of the workpiece being machined. Thus, by outputting signals related to the machining operations, the PLC 28 may communicate to the processing unit 22 tool-specific data, idling data, and time related data, just to name a few. Of course, the specific information output from the PLC 28 to the processing unit 22 may vary, depending on the type and quantity of information desired.

Figure 2:
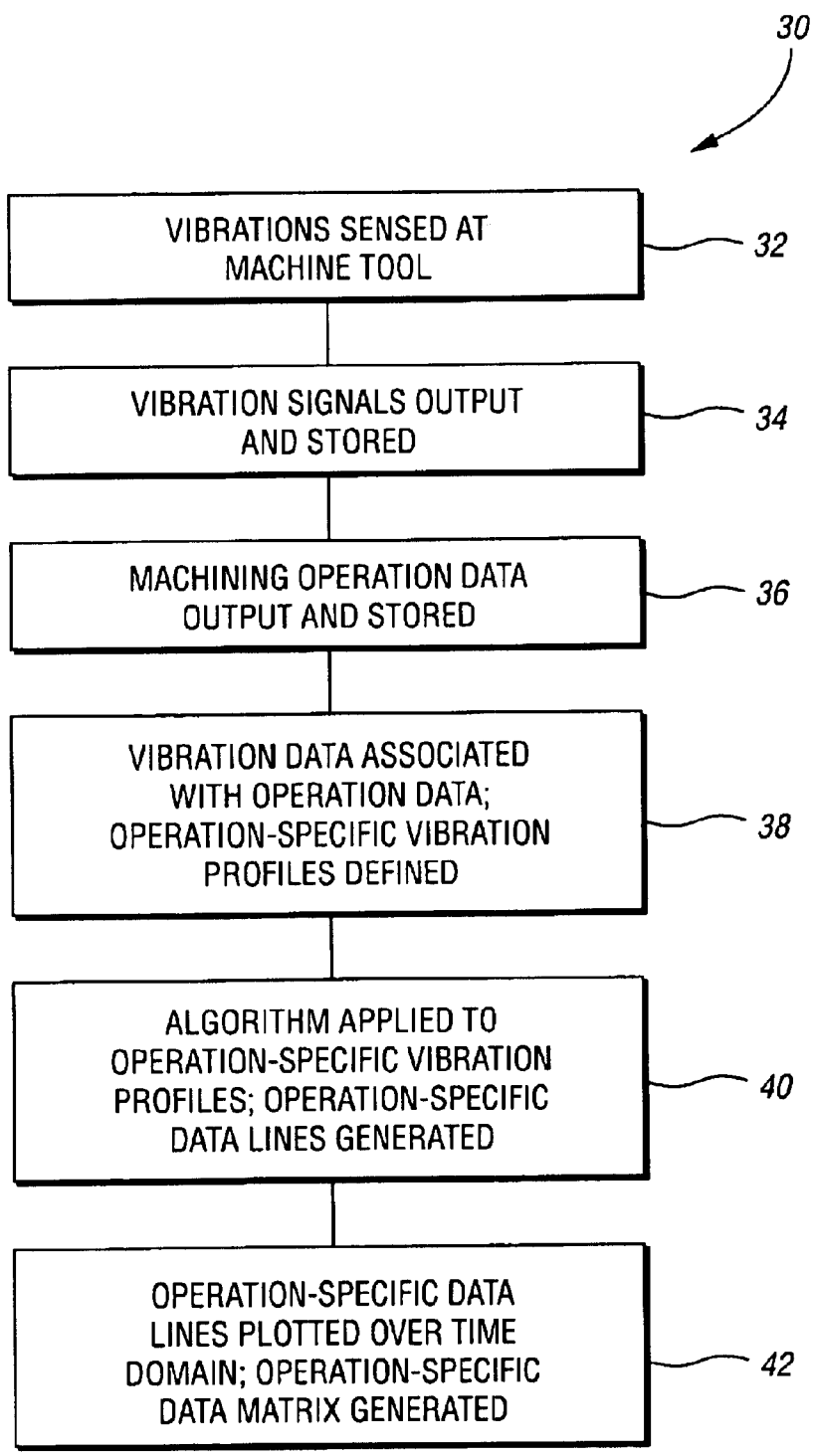
FIG. 2 is flowchart illustrating a method of utilizing the system shown in FIG. 1.

The flowchart 30, shown in FIG. 2, illustrates a method in accordance with the present invention, described herein with reference to the system in FIG. 1. During a machining cycle, which may consist of multiple operations using many different cutting tools, vibrations are sensed at the machine tool 11 by the sensor 20, see step 32. In step 34, signals related to the sensed vibrations are output to the processing unit 22 and stored in the memory 26. During the machining operations, operation data is output from the PLC 28 to the processing unit 22, where it is also stored in the memory 26, see step 36. It is worth noting that the vibration data and the machining operation data need not be output to the processing unit 22 simultaneously. Rather, both sets of data may include a time indicator that allows the data to be correlated at a later time.

The processor 24 performs the task of associating the vibration data with the operation data to define operation-specific vibration profiles, see step 38. The operation-specific vibration profiles, as an example, may include tool-specific profiles or idling profiles. In addition, tool-specific vibration profiles may include separate vibration profiles for different cuts performed by the same tool. For example, if during a machining cycle, a tool labeled Tool 1, is used to perform two different cuts, then two different tool-specific vibration profiles may be defined. That is, one vibration profile may be associated with Tool 1, Cut 1, while another vibration profile is associated with Tool 1, Cut 2. Indeed, each different tool and/or cut may be defined as a separate machining event, and separate vibration profiles may be defined for each different event.

In order to facilitate analysis of the vibration and machining data, and in particular to facilitate the generation of an operation-specific data matrix and trend lines, an algorithm is applied to the operation-specific vibration profiles, see step 40. The algorithm works on individual operation-specific vibration profiles to generate an operation-specific data line for each vibration profile to which the algorithm is applied. Of course, the algorithm need not be applied to every operation-specific vibration profile defined by the processor 24, but the more data points that are generated, the more information will be available to a decision-maker utilizing the data matrix and/or trend analysis.

A number of different algorithms may be used to generate the operation-specific data lines, with two examples being a root mean square (RMS) algorithm and a kurtosis algorithm, both of which are widely known and understood. The vibration profiles are a function of a vibration amplitude, defined in some convenient units such as a factor of the acceleration due to gravity (g's), and a time dependent parameter. When the algorithm is applied to a particular operation-specific vibration profile, an operation-specific data line is generated. This data line is then stored in the memory 26 to facilitate subsequent retrieval. Storing the data line allows the raw data—i.e., the vibration profile—to be discarded, thereby keeping the memory requirements low, and helping to reduce the cost of the processing unit 22.

As the machining operations continue, and many machining cycles are completed, many signals are output from the sensor 20 and the PLC 28, such that the processor 24 defines many operation-specific vibration profiles. The algorithm is subsequently applied to these vibration profiles to generate additional operation-specific data lines. These data lines are also stored in the memory 26 to facilitate subsequent retrieval.

In general, when a data line is generated, it has a time dependent length, typically the length of the specific operation, and represents a statistical value, such as a kurtosis or RMS value, of the raw data profile. When the algorithm is applied to a vibration profile, the resulting data line represents a statistical value of a vibration amplitude, which may or may not be normalized, as desired. From the operation-specific data line, a single, operation-specific data point can be determined. The operation-specific data point will be a function of a vibration amplitude, and a time related parameter. The time related parameter may be an actual time value—e.g., 1000 seconds from the start of a machining cycle—or it may be measured in a number of cuts or parts produced, both of which are indicative of a machining chronology.

Figure 3:
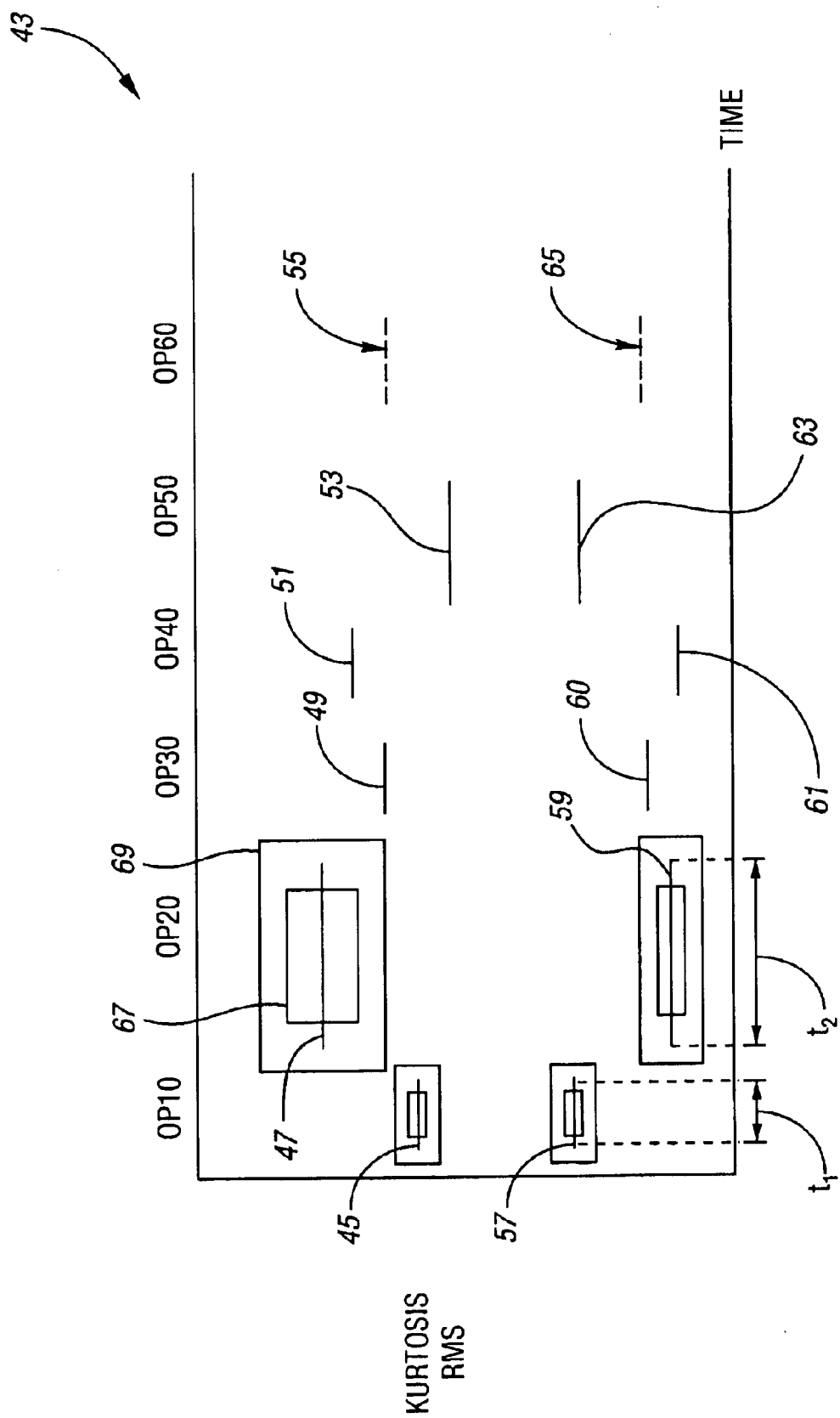
FIG. 3 is a data plot illustrating operation-specific data lines plotted over a time domain in an operation-specific data matrix.

Returning to FIG. 2, and in particular, step 42, the operation-specific data lines stored in the memory 26 are then retrieved and plotted over a time domain to generate an operation-specific data matrix, such as data matrix 43, shown in FIG. 3. The data matrix 43 includes operation-specific data lines 45, 47, 49, 51, 53. The data lines represent a statistical value of data processed from a data profile, such as a vibration profile. The data lines shown in FIG. 3 are rectilinear; in particular, they are horizontal. It is worth noting that such data lines may be oblique with respect to the axes, or they may be curvilinear, depending on the algorithm applied to the data profiles. Each data line 45, 47, 49, 51, 53, 55 is indicative of a different machining operation, Op 10, Op 20, Op 30, Op 40, Op 50, and Op 60, respectively.

Each operation has a pair of data lines associated with it, one being a kurtosis value, and the other being a RMS value. For example, Op 10 has associated with it, data lines 45, 57; Op 20 has data lines 47, 59, etc. A data matrix, such as the matrix 43, need not utilize two statistical parameters for each operation; however, as explained more fully below, using two statistical parameters may be beneficial in evaluating the machining operations. It is worth noting that the data lines 55, 65, for Op 60, are comprised of four shorter data line segments. These segments represent separate operations within Op 60. For example, if Op 60 is a drilling operation, and four holes are drilled, each line segment could represent a different hole. Thus, a data management system, such as the data management system 10, provides detailed information about operations, and even information about operations within operations.

The length of each data line in the matrix 43 is indicative of the machining time of the particular operation with which the data line is associated. For example, data lines 45, 47, associated with Op 10 and Op 20, respectively, have lengths of $t_1$ and $t_2$, respectively. The remaining data lines also have time related lengths, not specifically called out in the figure. Around the data lines 45, 47, 57, 59 are fault windows that define fault conditions. The remaining data lines also have fault conditions defined, but the fault windows are removed for clarity. Data line 47 has an inner fault window 67 and an outer fault window 69. Each fault window is indicative of a number of different fault conditions.

For example, the actual run time for Op 20 is indicated on the matrix 43 as $t_2$. Over the course of machining many workpieces, this time may vary. Some variation is expected, but too much variation may be indicative of a machining problem. Thus, the inner fault window 67 sets lower limits on the allowable operation time for Op 20. Similarly, the outer fault window sets upper limits on the allowable operation time for Op 20. Therefore, when the data line 47 has a length between the two fault windows 67, 69, no fault condition occurs for the operation time.

Besides operation time, the fault windows are also configured to indicate faults when the value of the data line is outside a predetermined value. For example, the inner fault window 67 provides upper and lower limits for the statistical value of the data line 47. Outside of these limits, a fault condition is indicated. In this example, the outer fault window 69 may be configured such that outside this window, a serious machining problem has occurred—e.g., the wrong operation is being performed. The fault windows may be defined manually, or, as explained more fully below, the machine tool 11 can be run in a learning mode to provide the processing unit 22 with information necessary to automatically define the fault windows.

One of the benefits of an operation-specific data matrix, such as the matrix 43, is that it provides a mechanism for evaluation of many different machining operations on the same machine tool. For example, to provide baseline data for future production runs, a workpiece may be machined according to a first set of machining operations. Typically, this first set of machining operations would constitute a machining cycle—i.e., all the operations to be performed on that one machine tool are performed on the workpiece prior to its removal. When the workpiece is removed from the machine tool, it may be a finished product, or it may need to be processed further on different machine tools, or included as part of an assembly operation.

Data from the first set of machining operations can be processed as described above, and operation-specific data lines generated. It is worth noting that a number of workpieces may be machined, and their data combined by operation, to generate a single set of operation-specific data lines. Thus, a single operation-specific data matrix could be generated for the workpieces machined according to the first set of machining operations. Similarly, workpieces may be machined according to different sets of machining operations, and operation-specific-data lines generated and stored. Typically, these different sets of machining operations are indicative of different parts being manufactured on the machine tool.

In this way, a family of operation-specific data lines can be stored in a memory, such as the memory 26. This allows evaluation of production runs for any part machined according to any of the previously run sets of machining operations. The workpiece is merely machined according to a set of operations required for that particular workpiece. A processing unit, such as the processing unit 22, generates operation-specific data lines for the production run. The production data is compared to all the previously stored data lines, and the processing unit determines which set of machining operations is being used for the production run. This determination is a result of pattern recognition by the processing unit—i.e., the production data lines have a pattern that is matched against the patterns of the previously generated data lines.

Once it is determined which set of machining operations is being performed, the processing unit can compare the production data for each operation to the previously generated data lines for that set of operations. The fault conditions would have been previously set for each operation, and the processing unit can thereby determine if the production run is within acceptable limits. When another workpiece is placed in the machine tool, and a different set of machining operations performed, the processing unit merely utilizes the pattern recognition described above to compare data from the new operations to the appropriate baseline data previously generated.

As discussed above, the operation-specific data lines may be generated according to more than one statistical algorithm—e.g., RMS and kurtosis. This provides more than on data line for each operation, which may increase the accuracy of the pattern recognition. Moreover, each different statistical parameter may have a different fault value defined, which may increase the recognition of faults that occur in production runs.

Figure 4:
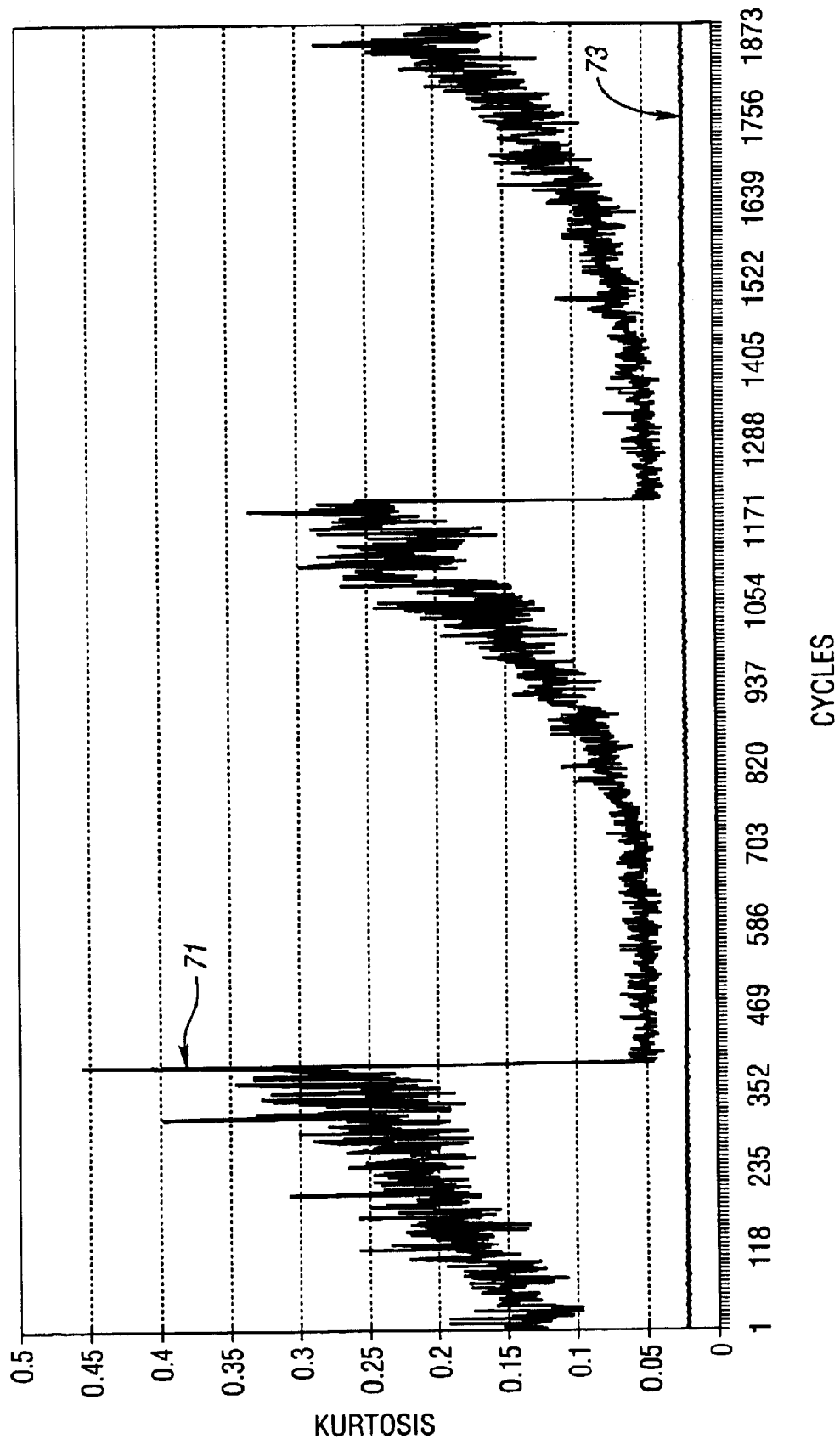
FIG. 4 is a data plot illustrating a data trend line for a cutting tool used on a milling machine.

In addition to providing operation-specific data lines that are easily evaluated using a processing unit, a machining data management system, such as the system 10, may also provide operation-specific trend lines. These may be useful to a manufacturing decision-maker, wishing to have a visual output of the information generated from the machining operations. FIG. 4 is an example of an operation-specific trend line generated from many different workpieces for the same operation. As explained more fully below, the operation-specific data points used to plot an operation-specific trend line, are generated from the same machining data as the operation-specific data lines used in the pattern recognition.

Turning to FIG. 4, it is seen that vibration profiles for "Op 10" from a milling machine have been processed according to the method described above, and trend lines have been generated. The ordinate is a kurtosis value, and the abscissa indicates the number of cycles. The operation-specific data points correlate to the operation-specific vibration profiles from which they were generated. The data points, and therefore trend lines, may be tool-specific data, such as line 71, or idling data, such as line 73.

In order to facilitate relevant output from the sensor 20 and the PLC 28, the machine tool 11 may be operated in a learning mode prior to production runs, so that the processor 24 can appropriately define the operation-specific vibration profiles. In addition to "teaching" the system 10 about particular machining operations, the learning mode also provides a mechanism for defining a fault condition, a process which is described more fully below. A properly defined fault condition can be useful in setting alarm levels and analyzing the operation-specific trend data resulting from use of the system 10.

Figure 5:
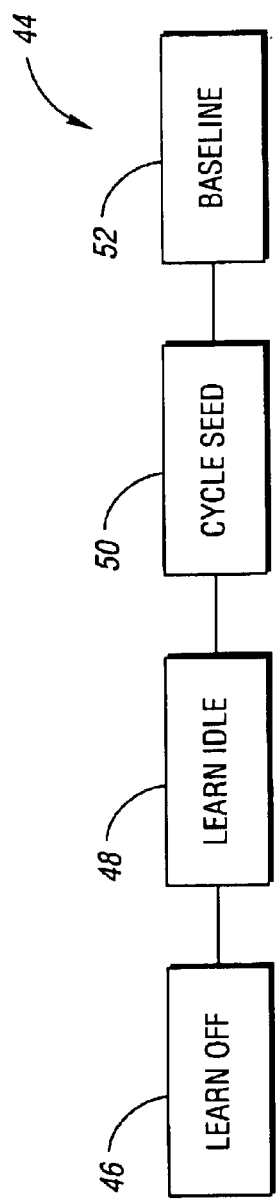
FIG. 5 is a flowchart illustrating a method of setting up the system shown in FIG. 1.

Operation of the machine tool 11 in the learning mode entails a number of steps which are generally shown in the flowchart 44 in FIG. 5. First, in step 46, system 10 learns the vibrations associated with the machine tool 11 when it is "off". Specifically, the sensor 20 is allowed to sense vibrations and output signals to the processing unit 22 when the machine tool 11 is powered-up, but not operating. The vibrations thus sensed will be background noise, resulting from such things as adjoining machines, electrical noise, and ancillary equipment on the machine tool 11 itself—e.g., pumps and blowers (not shown). In this step, the machine tool 11 is powered-up such that the ancillary equipment is operating, but the spindle 14 is not rotating.

Next, in step 48, the machine tool 11 is operated under idling conditions, wherein no material is removed from the workpiece 18. Thus, the spindle 14 is rotating, but no machining is occurring. After learning the "off" and "idling" conditions, the machine tool 11 is operated under controlled machining conditions for a first predetermined number of cycles, see step 50. This step may be referred to as "cycle seed", and involves machining workpieces for approximately 20 cycles, wherein an operator ensures that each of the 20 cycles is problem-free. The number of cycles need not be exactly 20, but may be more or less than 20.

After the "cycle seed", baseline data is gathered in step 52. During this step, the machine tool 11 is operated under machining conditions for a second predetermined number of cycles, which may be on the order of 10,000. During this step, the machining conditions are not controlled as they are during the cycle seed, and if there are machining problems—e.g., tool breakage—the baseline data gathering continues. After the second predetermined number of cycles are complete, the processor 24 automatically goes into a "run" mode, wherein trending of production machining data is performed.

During each of the steps in the learning mode, signals are sent from the sensor 20 and the PLC 28 to the processing unit 22. Thus, the processing unit 22 receives both vibration data and operation data during the learning mode operations. In addition to providing useful cycle data, running the machine tool 11 in the learning mode allows the processor 24 to define fault conditions for the various machining operations being evaluated.

A fault condition may be characterized by a single machine tool problem, such as a machining problem or an idling problem. Once defined, the fault condition may be used to help identify the presence of problems in future runs. For example, the processor 24 may define fault conditions for each cutting tool or each particular cut performed by a cutting tool. A fault condition for machine idling may also be defined. By having operation-specific fault conditions defined, a manufacturing decision-maker is provided with useful information to evaluate future production processes.

The process of defining the fault conditions is based on the data gathered during the learning mode machining, and therefore, is data-driven. This is in contrast to other types of machine analysis, which require a decision-maker to evaluate raw data and use an "educated guess" to define a fault condition. Specifically, the processing unit 22 is used to automatically define the fault conditions based on preprogrammed algorithms being applied to the data gathered during operation of the machine tool 11 in the learning mode. For example, similar to processing data from a production run, the processor 24 may use data gathered from the learning mode operation to define operation-specific vibration profiles, including tool-specific vibration profiles and idling vibration profiles.

The processor 24 can then apply a learning mode algorithm to the operation-specific vibration profiles, to generate operation-specific data lines. As in the processing of production data, an operation-specific data line is generated for each vibration profile to which the learning mode algorithm is applied. The learning mode algorithm may be similar to the algorithm used in processing production vibration data, for example, it may employ a RMS or kurtosis numerical routine to generate a statistical representation of the vibration data.

In addition to generating data lines, the learning mode algorithm can also be configured to eliminate certain data lines after they have been generated. For example, a value of three times the standard deviation of the value of the data lines ($3\sigma$) may be chosen as a predetermined limit. Because the data lines are operation-specific, a standard deviation for each set of operation-specific lines is then calculated. Any of the data lines which fall outside the $3\sigma$ limit for this operation are discarded. The remaining data lines are then processed using some statistical method to generate a fault condition for the specific operation being evaluated. It is worth noting that the "learning mode algorithm" need not be a single algorithm, but rather, may be more than one algorithm containing different instruction sets for processing the learning mode data. In addition, a limit other than 3σ may be used to allow more or less data points to be discarded.

Once the fault conditions have been defined, alarm conditions are defined. In general, the alarm conditions may be characterized by a predetermined number of fault conditions. The alarm conditions are also operation-specific, and therefore, may be defined based on the criticality of the operation. For example, for a truly critical operation, an alarm condition may be defined as a single fault condition. Conversely, for a less critical operation, an alarm may be defined as five fault conditions in any run of ten consecutive operations or cycles. By defining an alarm condition in terms of x-faults per y-operations (or cycles), where (x) and (y) are integers, a sliding window is used that adds consistency to data evaluation.

Figure 6:
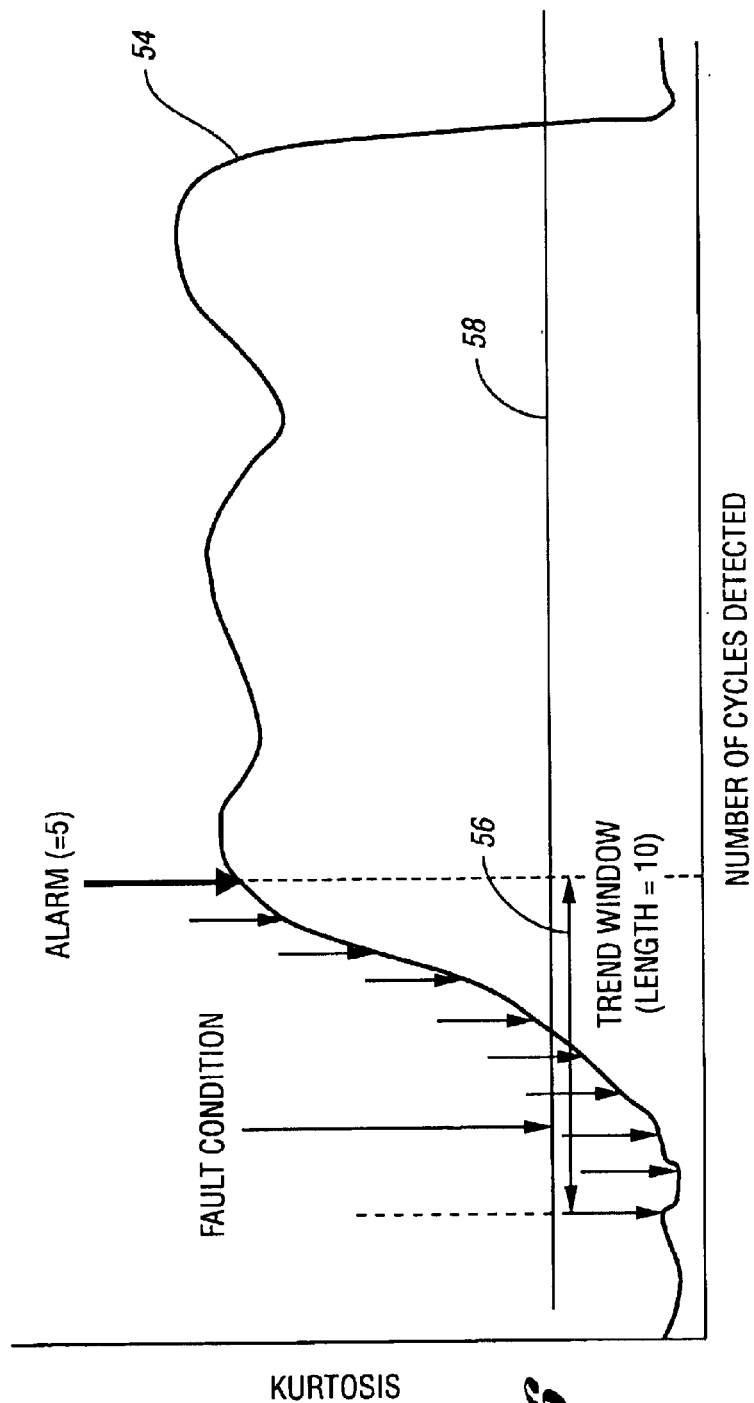
FIG. 6 is a data plot illustrating a data trend line and an indicator illustrating an alarm condition.

For example, FIG. 6 shows a trend line 54 for an operation having an alarm condition defined as five faults per ten cycles. In this example, a sliding window 56 has a length of ten cycles. During the first five cycles in the window 56, there are no fault conditions. This is indicated by the cycle data points being below the fault condition line 58. Conversely, the last five cycles in the window 56 are all above the fault condition line 58. It is not until the fifth fault condition cycle that an alarm is triggered. The alarm may be indicated by a light on the processing unit 22, or some other indicator, so that a machine tool operator is made aware of the alarm condition. Of course, having five consecutive fault cycles, as shown in FIG. 5, is not necessary to trigger an alarm that is set to five faults per ten cycles. Indeed, any five fault conditions, whether or not they are consecutive, would trigger an alarm so defined.

As briefly discussed above in conjunction with FIGS. 3 and 4, the operation-specific data lines and data points may be retrieved from the memory 26 and plotted over a time domain to facilitate analysis of various operations. For example, the processing unit 22 may be configured for attachment to an output device such as a personal computer (PC), or a personal digital assistant (PDA). The data lines may be plotted to create an operation-specific data matrix, and the data points may be plotted to create an actual trend line. Alternatively, the data may be fed into another program to further manipulate them to provide additional output.

Figure 7:
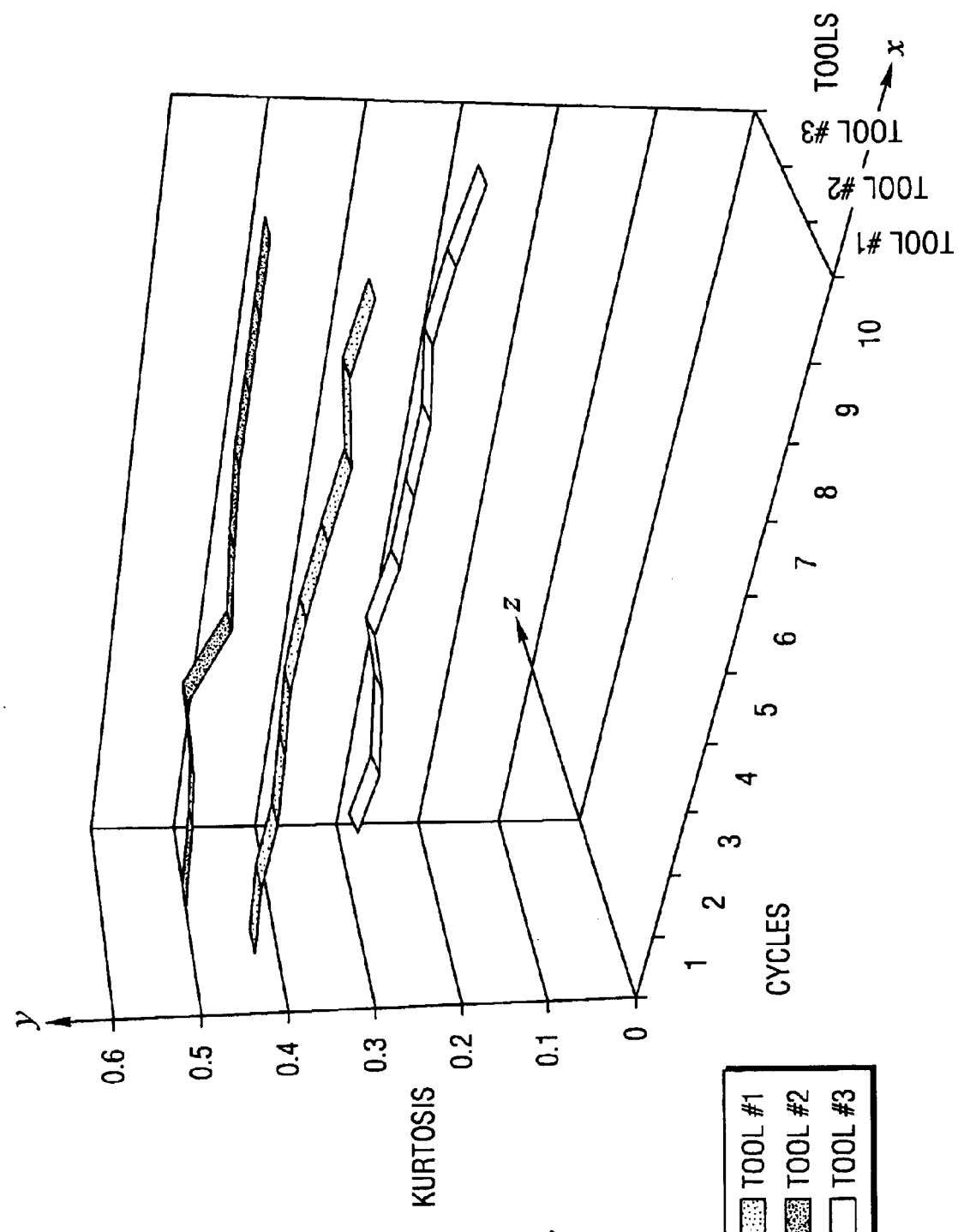
FIG. 7 is a three-dimensional data matrix illustrating operation-specific data lines and data trend lines for three different cutting tools.

An example of a three-dimensional data output is shown in FIG. 7. In this plot, three different tools are evaluated, and the data generated may be viewed as a tool-specific data matrix, similar to FIG. 3, or a tool-specific trend line, similar to FIG. 4. For example, viewing FIG. 7 along the y-z axes, provides a two-dimensional data matrix comprised of tool-specific data lines; conversely, viewing FIG. 7 along the x-y axes provides a two-dimensional trend line comprised of many individual data points.

Figure 8:
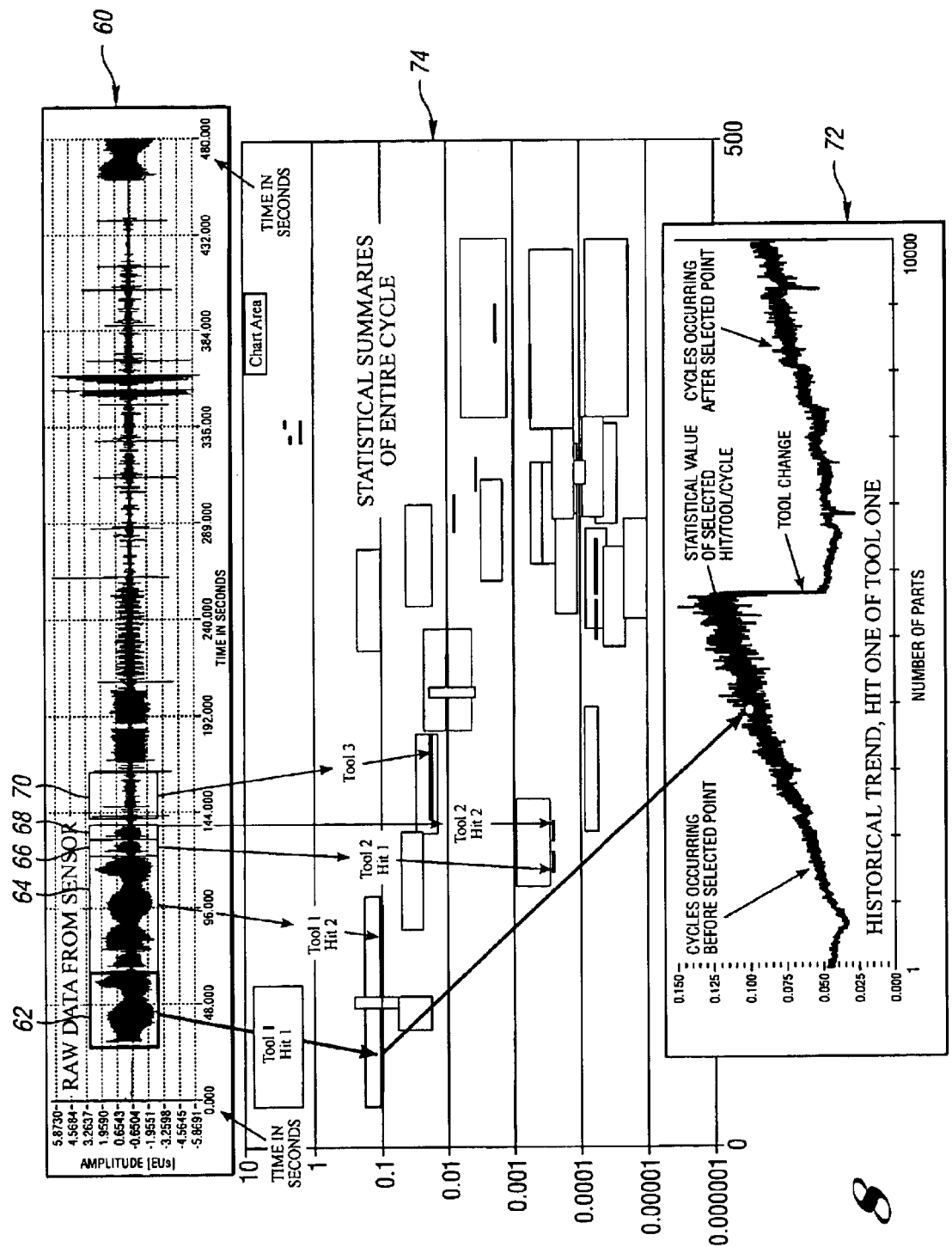
FIG. 8 is a combination of data plots illustrating a hierarchal database approach and the relationship between the data plots.

FIG. 8 shows how the two-dimensional data plots interact with each other and with a raw data profile. The first data plot 60 shows raw data output from a sensor, such as the sensor 20. Data plot 60 contains tool-specific vibration profiles. For example, shown in data plot 60 are vibration profiles 62, 64, 66, 68 and 70, representing Tool 1, Hit 1; Tool 1, Hit 2; Tool 2, Hit 1; Tool 2, Hit 2; and Tool 3, respectively. Each data profile has an amplitude in some convenient engineering units (EUs), plotted over a time domain.

From the data plot 60, individual, tool-specific data points may be generated by application of an algorithm such as described above. The individual data points are seen on the data plot 72. Plot 72 represents a portion of a three-dimensional plot, such as the one shown in FIG. 7. Specifically, plot 72 is a view of the x-y axes of such a three-dimensional plot, looking in the z-direction. Similarly, plot 74 is a view of the y-z axes of a three-dimensional plot, looking in the negative x-direction.

The data plot 72 is illustrative of a historical trend for Tool 1, Hit 1. This may represent a particular cut (Hit 1) of the first tool (Tool 1) in a long series of machining processes and cycles utilizing multiple tools. Such a plot provides information not available from conventional machine tool data management systems. Thus, a manufacturing decision-maker can observe a historical trend for an operation-specific event, such as "Tool 1, Hit 1", and use this trend to make decisions regarding increasing the efficiency and overall efficacy of the operation.

Data plot 74 shows statistical summaries over an entire cycle, wherein multiple events are viewed on the same plot. The data plot 74 shows an operation-specific matrix of the type that might be generated from a production run, and, as described above, may also be used to evaluate production machining operations. Information, such as the information presented in data plots 72, 74, provides a manufacturing decision-maker with data at the level of specificity necessary to make decisions to improve quality and lower costs. The availability of such data directly results from the use of an operation-specific data management system, such as the system 10.

While the best mode for carrying out the invention has been described in detail, those familiar with the art to which this invention relates will recognize various alternative designs and embodiments for practicing the invention as defined by the following claims.

What is claimed:

1. A method for managing machine tool data using a data matrix, the machine tool having a plurality of tools for performing machining operations on a workpiece, at least one sensor operatively connected to the machine tool for sensing a machine operation parameter and outputting signals related to the sensed parameter, and a controller configured to output signals related to the machining operations, the method comprising:

performing a first set of machining operations on the workpiece;

processing data from signals output from the at least one sensor and from the controller to define operation-specific data profiles; and applying an algorithm to at least two of the operation-specific data profiles to generate an operation-specific data line for each of the at least two operation-specific data profiles, thereby facilitating generation of an operation-specific data matrix, the operation-specific data lines having a time dependent length and representing a statistical value of the sensed parameter.

2. The method of claim 1, further comprising:

performing the first set of machining operations on at least one additional workpiece;

generating operation-specific data lines for the at least one additional workpiece; and combining operation-specific data lines by operation for the first workpiece and the at least one additional workpiece, thereby facilitating generation of a single, operation-specific data matrix for all of the machined workpieces.

3. The method of claim 1, further comprising defining a least one fault condition for each of the operations performed on the workpiece.

4. The method of claim 3, wherein defining a fault condition comprises:

operating the machine tool in a learning mode, the learning mode including operating the machine tool under idling conditions without removing material from a workpiece, operating the machine tool under controlled machining conditions for a first predetermined number of cycles, and operating the machine tool under machining conditions for a second predetermined number of cycles, larger than the first predetermined number of cycles;

processing data from signals output from the at least one sensor and from the controller during the learning mode operation to generate learning mode operation-specific data profiles;

applying a learning mode algorithm to at least two of the learning mode data profiles to generate an operation-specific data line for each of the at least two learning mode data profiles;

discarding a data line if its value is outside a predetermined limit; and defining a fault condition based on the data lines not discarded.

5. The method of claim 1, further comprising plotting a single, operation-specific data point for each operation-specific data line, thereby creating an operation-specific trend line.

6. The method of claim 1, further comprising generating operation-specific data lines for different sets of machining operations performed on the machine tool, thereby facilitating generation of an operation-specific data matrix for each set of machining operations performed.

7. The method of claim 6, further comprising:

machining a production workpiece on the machine tool;

generating operation-specific data lines for the production workpiece; and comparing the production workpiece data lines with previously defined data lines, thereby facilitating evaluation of the production workpiece machining.

8. The method of claim 1, wherein the at least one sensor is configured to sense at least one of vibrations, current, temperature, torque and speed.

9. The method of claim 1, wherein the operation-specific data lines include at least one of tool-specific data lines and idle data lines.

10. A method for managing machine tool data using a data matrix, the machine tool having a plurality of tools for performing machining operations on a workpiece, at least one sensor operatively connected to the machine tool for sensing a machine operation parameter and outputting signals related to the sensed parameter, and a controller configured to output signals related to the machining operations, the method comprising:

sensing a machine operation parameter from the machine tool for a first set of machining operations;

storing data related to the sensed parameter;

storing data from signals output from the controller;

associating the data from the sensor with the data from the controller, thereby defining operation-specific data profiles;

applying an algorithm to at least two of the operation-specific data profiles to generate an operation-specific data line for each of the at least two operation-specific data profiles, the operation-specific data lines having a time dependent length and representing a statistical value of the sensed parameter; and storing the operation-specific data lines, thereby facilitating subsequent retrieval.

11. The method of claim 10, further comprising:

retrieving the operation-specific data lines; and plotting the data lines to create an operation-specific data matrix.

12. The method of claim 10, wherein each of the data lines is a function of a normalized vibration amplitude and time.

13. The method of claim 10, further comprising:

defining a fault condition characterized by a single machine tool problem, the machine tool problem including one of a machining problem and an idling problem; and defining an alarm condition characterized by a predetermined number of fault conditions.

14. The method of claim 13, wherein defining a fault condition comprises:

operating the machine tool in a learning mode, the learning mode including operating the machine tool under idling conditions without removing material from a workpiece, operating the machine tool under controlled machining conditions for a first predetermined number of cycles, and operating the machine tool under machining conditions for a second predetermined number of cycles, larger than the first predetermined number of cycles;

processing data from signals output from the at least one sensor and from the controller during the learning mode operation to generate learning mode operation-specific data profiles;

applying a learning mode algorithm to at least two of the learning mode data profiles to generate an operation-specific data line for each of the at least two learning mode data profiles;

discarding a data line if its value is outside a predetermined limit; and defining a fault condition based on the data lines not discarded.

15. The method of claim 10, further comprising:

performing the first set of machining operations on a plurality of workpieces;

generating operation-specific data lines for each of the workpieces machined; and combining operation-specific data lines by operation for each of the machined workpieces, thereby facilitating generation of a single, operation-specific data matrix for all of the machined workpieces.

16. The method of claim 15, further comprising:

machining a production workpiece on the machine tool;

generating operation-specific data lines for the production workpiece; and comparing the production workpiece data lines with previously defined data lines, thereby facilitating evaluation of the production workpiece machining.

17. A data management system for a machine tool having a plurality of tools for performing machining operations on a workpiece, and a controller configured to output signals related to the machining operations, the data management system comprising:

a sensor configured to be operatively connected to the machine tool for sensing a machine operation parameter and outputting signals related to the sensed parameter;

a processor operatively associated with the sensor and the controller, and configured to associate data from the signals output from the sensor and from the controller to generate operation-specific data profiles, the processor being further configured to apply an algorithm to at least two of the operation-specific data profiles, thereby generating an operation-specific data line for each of the at least two operation-specific data profiles; and a memory operatively associated with the sensor, the controller, and the processor, and configured to store information including the operation-specific data lines, thereby facilitating subsequent retrieval of the stored information.

18. The data management system of claim 17, wherein the operation-specific data lines include a time dependent length and represent a statistical value of the sensed parameter.

19. The data management system of claim 17, wherein the operation-specific data profiles include tool-specific data profiles and idling data profiles.

20. The data management system of claim 19, wherein the processor is further configured with an alarm condition defined as a predetermined number of fault conditions in a predetermined number of machine cycles.

21. The data management system of claim 17, further comprising an output device configured to receive the operation-specific data lines from the memory, and to plot the data points over a time domain, thereby generating an operation-specific data matrix.

22. The data management system of claim 17, wherein the sensor is further configured to sense at least one of vibrations, current, temperature, torque and speed.

* * * * *